(12) United States Patent  
Metcalfe

(10) Patent No.: US 8,209,310 B1  
(45) Date of Patent: Jun. 26, 2012

(54) SYSTEM AND METHOD OF MATCHING PROFESSIONALS FOR NETWORKING MEETINGS

(75) Inventor: Scott Metcalfe, St. Charles, IL (US)

(73) Assignee: Empire Consulting, Inc., St. Charles, IL (US)

( * ) Notice: Subject to any disclaimer, the term of this patent is extended or adjusted under 35 U.S.C. 154(b) by 660 days.

(21) Appl. No.: 12/239,550

(22) Filed: Sep. 26, 2008

Related U.S. Application Data

(60) Provisional application No. 60/995,372, filed on Sep. 26, 2007.

(51) Int. Cl.  
*G06F 17/30* (2006.01)

(52) U.S. Cl. ........ 707/705; 707/736; 707/769; 707/790; 707/794; 707/802; 709/204; 709/218

(58) Field of Classification Search .................. 707/769, 707/790, 794, E17.014, E17.018, E17.032, 707/999.006, 999.105, 705, 736, 802; 709/204, 709/218  
See application file for complete search history.

(56) References Cited

U.S. PATENT DOCUMENTS

| | | | |
|---|---|---|---|
| 5,086,394 A | | 2/1992 | Shapira |
| 5,963,913 A | * | 10/1999 | Henneuse et al. ........... 705/7.13 |
| 5,963,951 A | * | 10/1999 | Collins ................... 1/1 |
| 5,974,406 A | * | 10/1999 | Bisdikian et al. ..................... 1/1 |
| 6,016,478 A | * | 1/2000 | Zhang et al. ................. 705/7.19 |
| 6,052,122 A | * | 4/2000 | Sutcliffe et al. ............... 715/751 |
| 6,073,138 A | | 6/2000 | de l'Etraz et al. |
| 6,324,541 B1 | | 11/2001 | de l'Etraz et al. |
| 6,880,213 B1 | | 4/2005 | Asada |
| 6,963,900 B2 | | 11/2005 | Boyd |
| 7,069,308 B2 | | 6/2006 | Abrams |
| 7,117,254 B2 | | 10/2006 | Lunt et al. |
| 7,523,385 B2 | * | 4/2009 | Nguyen et al. ................ 715/200 |
| 2002/0049709 A1 | * | 4/2002 | Miyasaki et al. ................ 707/1 |
| 2002/0194018 A1 | | 12/2002 | Scott |
| 2003/0014373 A1 | | 1/2003 | Perge |
| 2003/0078788 A1 | | 4/2003 | Sussman |
| 2003/0110089 A1 | | 6/2003 | Villani |
| 2005/0004986 A1 | * | 1/2005 | Aoki et al. .................... 709/206 |
| 2005/0228713 A1 | | 10/2005 | Manzolillo |
| 2006/0112086 A1 | | 5/2006 | Douress et al. |
| 2006/0122861 A1 | | 6/2006 | Scott |
| 2006/0155566 A1 | | 7/2006 | Berger |
| 2006/0242014 A1 | | 10/2006 | Marshall |
| 2008/0188261 A1 | * | 8/2008 | Arnone ...................... 455/550.1 |
| 2010/0070577 A1 | * | 3/2010 | Relyea et al. ................. 709/204 |

\* cited by examiner

*Primary Examiner* — Shahid Alam  
*Assistant Examiner* — Andalib Lodhi  
(74) *Attorney, Agent, or Firm* — Erickson Law Group, PC

(57) ABSTRACT

A professional networking system and method that facilitates a meeting between two or more users of the system for the purpose of expanding the users' professional networks. Users are matched by the system based on one or more available meeting dates of each user, and one or more sought characteristics corresponding to one or more characteristics of the second user that the first user profile seeks in another user. The system does not directly reveal the characteristics of one matched user to any other user except certain basic contact information may be disclosed to another matched user to facilitate a meeting.

22 Claims, 5 Drawing Sheets

SYSTEM AND METHOD OF MATCHING PROFESSIONALS FOR NETWORKING MEETINGS

CLAIM OF PRIORITY

This application claims the benefit of U.S. Patent Application No. 60/995,372, which was filed Sep. 26, 2007.

TECHNICAL FIELD OF THE INVENTION

The present invention relates to systems and methods of introducing people, and particularly the introduction of professionals that desire to expand their professional network.

BACKGROUND OF THE INVENTION

The process of introducing professionals has been called business or professional networking. Professional networking is an important part of an individual professional's success as well as overall business success. A key component to professional networking is meeting new professionals, such as business people, business owners, sales people, engineers, lawyers, accountants, doctors, members of not-for-profit organizations, and entrepreneurs. An additional key to professional networking is establishing ongoing relationships with such professionals.

Each professional network connection is not of equal value. The present inventor has recognized that it would be desirable to increase the number of networking contacts made in order to increase the likelihood of making valuable connections.

Presently, professional networking can occur in a number of ways. The present inventor has recognized that each has substantial shortcomings. First, networking introduction events are where professionals interested in meeting other professionals gather at a specific place and time. U.S. Patent Application 2006/0122861 discloses a system of matching business executives for meeting at a pre-planned conference or event. However, attendees cannot be sure that desirable contacts will attend or be interested in connecting. Further, such an event may not be held at convenient places or times. Similarly, Chamber of Commerce type events may yield only a few interesting conversations in relation to the time required. Also, those events may not occur with sufficient frequency to make the desired number of networking connections. Other more structured networking groups also have drawbacks. Such groups may not attract professionals from a sufficiently broad variety of businesses or occupations. Referrals within structured groups may not occur with sufficient frequency and the group may have a limited geographic reach. Another drawback of the aforementioned networking opportunities is that frequently the professional may attend an event only to discover that he had already met all or most of the attendees previously, thus wasting both precious time and money.

Second, one may attempt to expand their network by calling desirable contacts directly, with no prior introduction. This is commonly known as "cold calling." However, many are uncomfortable contacting strangers directly. There is an increased chance of receiving a negative response to a "cold call" because the individual receiving the cold call may have no interest in speaking to the caller.

Third, U.S. Pat. No. 6,073,138 and U.S. Pat. No. 6,324,541 describe social networks and the use of online systems to exploit them. Generally, these systems collect networking contacts in what amounts to computerized address books. But, there is no guarantee an address book contact represents a relationship that can be utilized. These systems do not provide a sufficient mechanism to facilitate meetings at mutually convenient times. Further, these or similar systems do not provide specific, unbiased feedback on an individual's performance as a networker, referral partner or other role depending upon the types of meeting held previously. Face-to-face networking and referrals have more impact than requesting an electronic introduction through third parties on networking websites.

Professionals that understand the importance of developing professional networks and referral sources are not successful at doing so for several reasons, including, insufficient time to attend networking events that hold an uncertain or perceived low return on time invested; fear of rejection; lack of networking expertise; lack of comfort in large group settings; expense constraints; and lack of tangible incentives to develop their professional network or referral sources. Individuals are more likely to perform the tasks when completion of those tasks, for example professional networking, is supported by a closely aligned incentive system and when performance is measured. Therefore, the present inventor has recognized that it would be desirable to have a system that provided tangible incentives or encouragement for individuals to both use and grow their existing networking options.

Although many professionals desire to meet for networking purposes, professionals generally do not want to publicly list the equivalent of a "personal ad" for networking purposes, that reads, for example, "professional of type XX seeking another professional type YY for a lunch meeting, please call xxx-xxxx." The present invention recognizes that it would be desirable to have a system that facilitates meetings, for a variety of purposes, in a more professional fashion, maintaining complete anonymity to all but the matched participants.

The present inventor recognizes that face-to-face communication is the best way to create and expand a meaningful network of contacts and referral sources. The present inventor also recognizes that it would be desirable to have a system that made a meeting between two or more qualified users easy and effective.

SUMMARY OF THE INVENTION

The present invention provides a system and method that facilitates a meeting between two or more individuals for the purpose of expanding both the individuals' professional networks. This professional networking system matches individuals based on certain criteria, including for example the individual's specified date and time of availability. The system facilitates meetings at available times in an individual's schedule by notifying users of the match. The system does not create or require a pre-existing networking event.

An individual becomes a member by joining the system through, for example, a website. A user provides the system with the dates and times he or she is available to meet. The user also provides additional match preference data as sought user characteristics, such as preferred geographic meeting area(s), and the characteristics of those individuals that the user would like to meet. The system may allow certain types of users, such as master users that have paid a premium membership fee, to set advanced preferences for meeting eligible users that meet specified criteria. The system regularly runs a matching analysis of all of the eligible users' profiles, matches users based on their profiles and sought characteristics, and notifies the users of the match. The system may suggest a business forum where the meeting could be held. The system may also provide the users with coupons or discount codes from an advertiser database for certain products or services that may be useful to the date (meeting) attendees. The users contact each other and arrange to meet either in person or by technological means at a specific time and place. The technological means includes phones, mobile electronic devices, email, the Internet, a website, or an internet chat program. After meeting, the users provide the system with feedback on the meeting and the attendee(s). In one aspect of the embodiment, the system optionally adds the feedback data to the user profile and the system may use that data in making future matches.

In an aspect of the embodiment, the system may be accessed, date notices received, dates confirmed, and feedback provided via a mobile device, such as a mobile phone, personal digital assistant, or pocket personal computer. A user's ability to access the system or obtain matches may depend on whether the user has paid a subscription fee.

In one aspect of the embodiment, the system does not reveal the characteristics of one matched user to any other user including another matched user. However, the system may disclose basic contact information of one matched user to another matched user. The user's characteristics of the user profile are private and not public. The system uses private user profile characteristics of each user to generate a match, without disclosing those characteristics of one user to another user. This is in contrast to other networking systems and websites where a user's profile including user profile characteristics are made publicly available to other users or the public at large.

Numerous other advantages and features of the present invention will become readily apparent from the following detailed description of the invention and the embodiments thereof, and from the accompanying drawings.

DETAILED DESCRIPTION OF THE PREFERRED EMBODIMENTS

Figure 1:
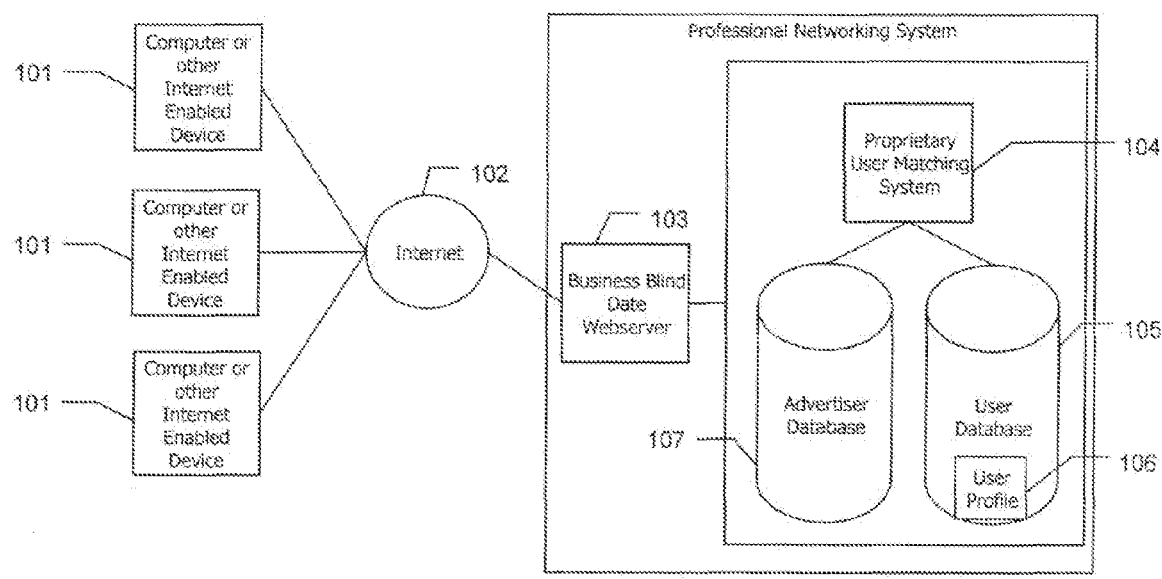
FIG. 1 is an illustration of a system in accordance with the present invention.

While this invention is susceptible of embodiment in many different forms, there are shown in the drawings, and will be described herein in detail, specific embodiments of the invention with the understanding that the present disclosure is to be considered as an exemplification of the principles of the invention and is not intended to limit the invention to the specific embodiments illustrated.

This application claims the benefit of U.S. Patent Application Ser. No. 60/995,372, which is incorporated by reference.

FIG. 1 illustrates an exemplary system of the present invention, in which one or more user devices 101, such as personal computers mobile devices, mobile phones, personal digital assistants, or pocket personal computers are capable of communicating with the professional networking system, via a network 102, such as the Internet. In one aspect of the embodiment, the system may comprise computer executable instructions. Those instructions may be executed in a processing unit of a computer or multiple computers so that when executed the instruction program the processing unit perform certain predefined functions or operations on data, including data of the system in a datastore, to produce a result of the system. The datastore is a data structure for storing data of the system, including user data and advertiser data. The datastore may comprise one or more databases. Mobile devices may communicate with the professional networking system from a wireless network. The wireless network may be capable of connecting to the Internet 102. Although in one preferred embodiment the user interacts with the system via a network such as the Internet, in another embodiment the user may communicate with a human operator, and the human operator may input the user's information into the system via the network. In that embodiment the human operator acts as an intermediary between the user and the system. The professional networking system includes a user database 105 that stores information about users of the system, including contact information, meeting preference data and, feedback ratings from prior meetings as explained below. The datastore comprises the user database 105 and an advertiser database 107.

In FIG. 1, the user database 105 stores information on each user in a user profile 106. The user profile 106 contains contact information and user profile characteristics such as, name, company, industry, phone number, email address, primary zip code, and secondary zip codes. The user profile 106 comprises one or more meeting parameters that include the dates and times when the user is available to meet. The user profile may comprise user profile characteristics that include the geographic area(s) where the user is willing to meet. The user profile 106 may contain the user's contact preference, such as phone, cell phone, or email.

In one aspect of the embodiment, there may be multiple levels of membership, advanced members able to set meeting criteria preferences, including sought characteristics, such as industry preference, meeting purpose, minimum feedback scores, job tide, and/or number of employees. The user profile may have a user group parameter comprising one or more values representing one or more groups of which the user is a member. Levels of membership may be represented as a user group. The user profile may contain an advance notice requirement representing a minimum time frame specified by the user, the minimum time frame being the time between a notice of a meeting and an actual meeting date and/or time.

Profile characteristics may also comprise (a) a geographic meeting area in which a user prefers a meeting to be located; (b) a business type corresponding to the type of business a user operates; (c) a gender of a user; (d) an advance notice requirement representing; (e) a time of day in which a user prefers to meet; (f) a feedback rating calculated based on feedback ratings provided by users that had prior meetings with a user; (g) a follow-through rating calculated based on responses by users that had one or more prior meetings with a user, wherein the response indicated whether the user followed through with plans made during prior meetings; (f) a referral network strength rating calculated based on the number of other users referred to the system by the user; (h) a meeting count representing the number of meetings a user had during a predefined time period; and/or (i) one or more referred users IDs representing users referred to the system by the user. The user profile 106 may be a discrete file or may comprise a data structure that contains links to various files or other data structures which have data related to the user. The user profile 106 may be a compilation of files and links to other data structures, both of which having data related to the user.

In one aspect of the embodiment, a user could specify a sought characteristic being a meeting purpose such as, networking, strategic partnering, master mind group, industry alliance, seeking job, seeking employees, seeking suppliers, seeking services, seeking expertise, seeking mentor, seeking knowledge, seeking referrals, or seeking manufacturer. The system maintains, in the user profile 106, a user's history of past involvement in the system, such as feedback from prior meetings, number of dates held, type of industries met with, number of new members recruited to the system, and other relevant data.

Figure 5:
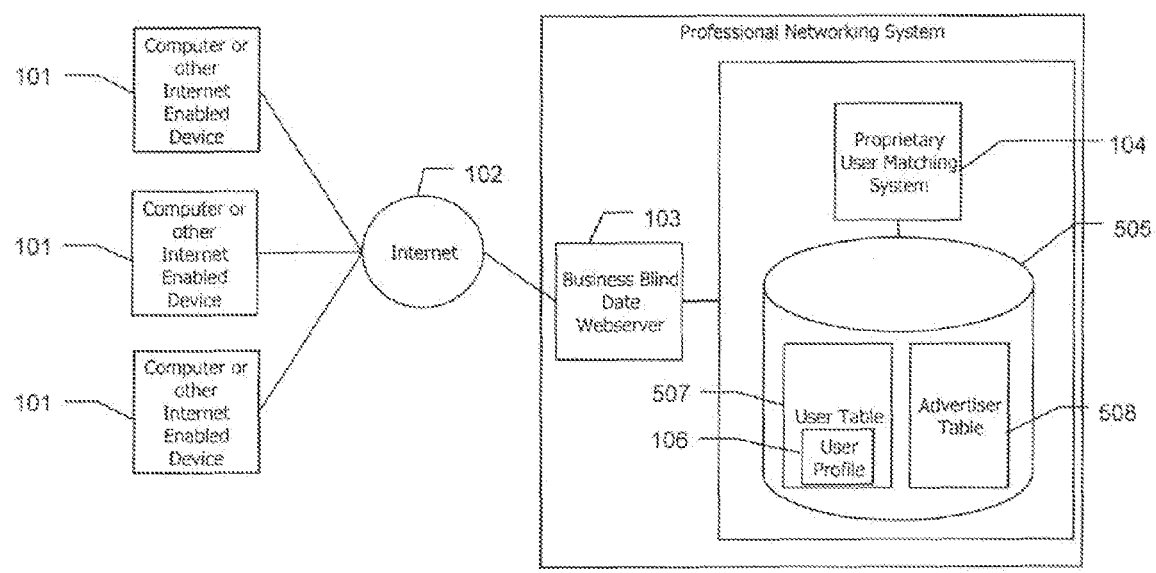
FIG. 5 is an illustration of an alternative embodiment of the system in accordance with the present invention, where the user and advertiser information is contained within one database.

FIG. 5 shows an alternative to the embodiment shown in FIG. 1, In FIG. 5 the system contains one database 505 that contains two or more tables 507, 508. Rather than having multiple databases as is shown in FIG. 1, FIG. 5 shows an embodiment where the user information is held in a user table 507 and the advertiser information is held in another table 508 within the same database. The system otherwise operates similarly to the embodiment shown in FIG. 1.

Figure 2:
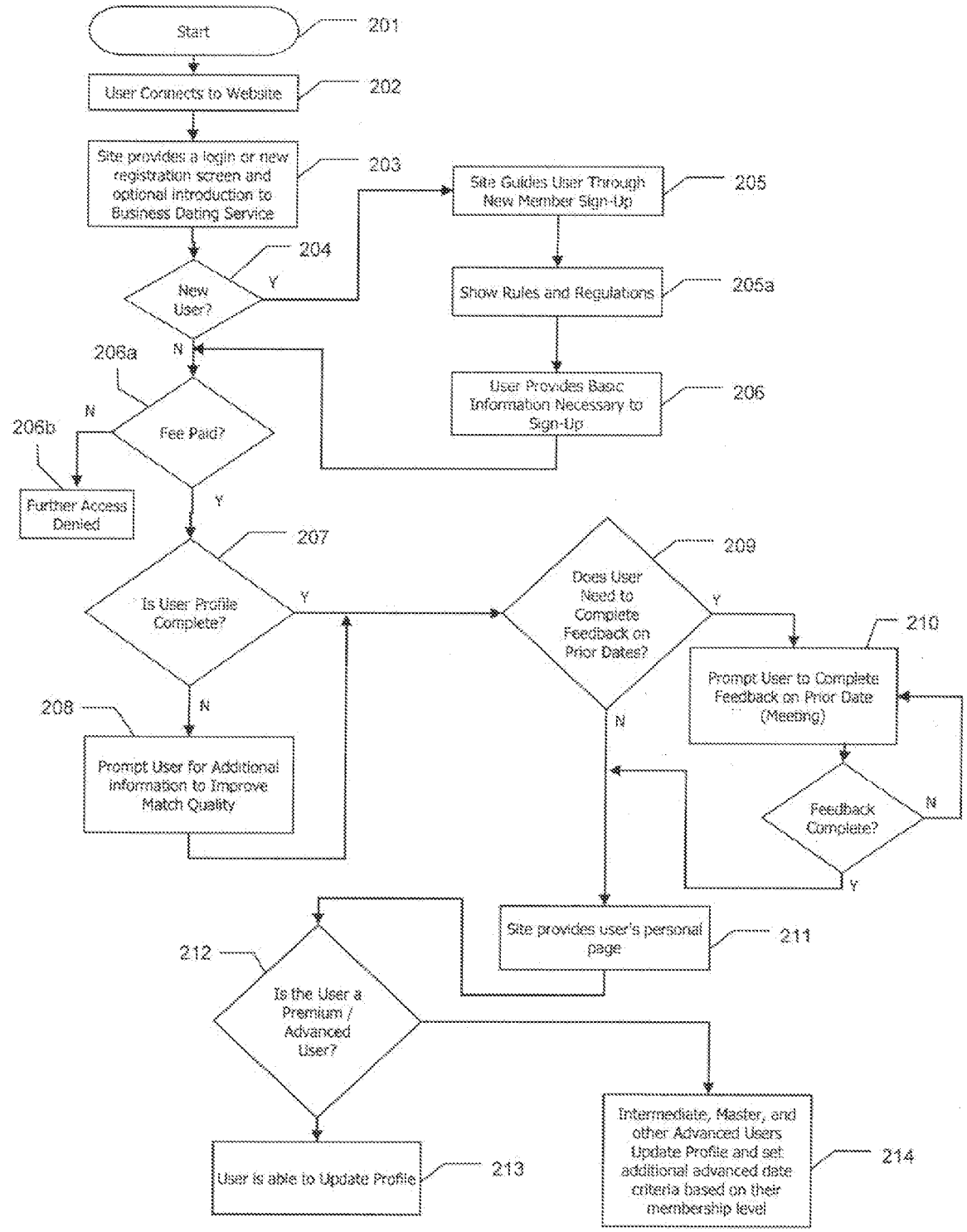
FIG. 2 is a block diagram illustrating a process in accordance with the present invention for registering new users and allowing current users to view their upcoming dates (meetings) and to modify certain profile parameters.

FIG. 2 illustrates an exemplary process, in accordance with the present invention, for registering new users and allowing current users to view their upcoming dates (meetings) and to modify certain profile parameters. In step 201, a user connects to the system by, for example, entering the URL for the system's website into an Internet browser or selecting a hyperlink, button, or bookmark for the site. In step 202, the site presents an initial welcome screen providing a method for existing users to login and new users to sign-up to become a member of the site. At step 202, the site may optionally provide an introductory screen and/or a link to a site tour and/or other information about the site that would be useful to a new user. At step 204, the system determines whether the user is a new user or an existing user.

If the user is a new user, the site proceeds to step 205, where the user is guided through the new member signup process. During the new member signup process the new member is provided the opportunity to input both a referring member identification number and a promotional code, if applicable. Promotional codes may be associated with a sponsor individual or business. The system tracks, in a database or a file, the use of promotional codes for grouping and reporting purposes. If referring member identification is used, the referring member is credited with the referral and receives a referral incentive payment either directly, or as a donation to a favorite charity. When a new member reaches step 207 and has successfully joined, the system assigns the new member a unique referral identification number that can be used to track new member' referral incentives.

In step 205a, the user is shown the rules and regulations of the system. The user must agree to the rules and regulations. Then, in step 206 the user provides basic information to establish membership in the system and a user profile 106.

The new users, as well as existing users from step 204, are then routed to step 206a where the system checks to determine whether the user's membership dues, if required, are paid. If the dues are not paid then, in Step 206b the user is not permitted access to the system or is prompted to make a payment. Next in step 207, the system determines whether the user's profile is complete. If the user profile is not complete, in step 208, the system prompts the user to provide additional information. A complete profile will improve the effectiveness of the matching algorithm in step 305.

In one aspect of the embodiment, the system, in step 209, will determine whether the user has not completed the feedback survey, as in step 407, for any prior meeting. If the user needs to complete a feedback survey, the system will prompt the user to complete that survey 210. In step 210a, the system determines whether the user completed the required feedback survey. If the user did not complete the survey, the system sends the user back to step 210 to complete the survey.

In step 211, the site displays the user's personal page, containing information such as, upcoming dates (meetings), a list of prior meetings, a list of referrals made, a notification if feedback is required, a link to a form for generating an email, phone message, or text message to invite new members, a notification of the expiration dates for one or more meeting windows, and a link to a form, email, text message for posting suggestions or feedback. The meeting windows comprise time periods during which matched members must meet.

From the user's personal page, in step 213 and step 214, the user is able to change certain profile information, such as contact information, past and present occupations, and departments and organizational levels. From the user's set meeting page the user can request networking meetings using a variety of sought characteristic parameters including date, time, geographic preference, industry and gender. More advanced users have the ability to specify additional sought characteristic preferences, for example alumni affiliation and past occupations. In one embodiment, the system allows, in step 212, certain types or levels of users, such as master, advanced, or intermediate level users that have paid a premium membership fee, to set advanced preferences for meeting users that meet specified criteria. Such sought characteristic criteria could, for example, include industry preference, meeting purpose, minimum feedback scores, job title, and/or number of employees employed by a user.

Figure 3:
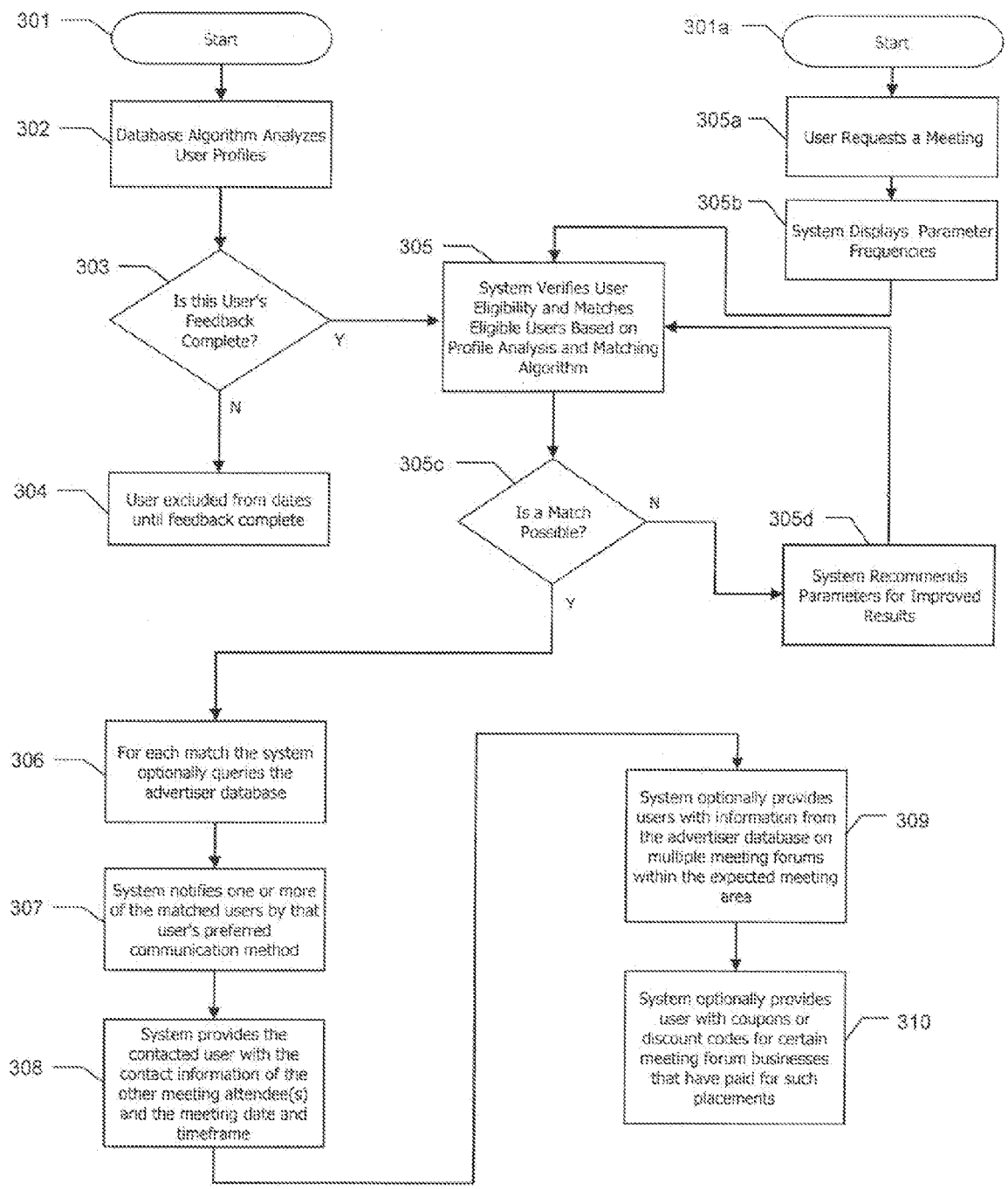
FIG. 3 is a block diagram illustrating a process in accordance with the present invention for analyzing user profiles in the user database, matching users for dates (meetings), and notifying users of the match.

FIG. 3 illustrates an exemplary process, in accordance with the present invention, for analyzing user profiles 106 in the user database 105, matching users for dates (meetings), and notifying users of the match. In step 302, the system analyzes user profiles on an on-going or regular basis. The system provides an ongoing analysis algorithm for efficient matching in that if a match is not made immediately the system does not rerun the algorithm until system data, for example data in the user database, is changed, because without a change a match will not be made with the same data. In one embodiment, the system, in step 303, will determine whether the user has not completed the feedback survey 407 for any prior meeting. The system will may allow a user to request a new date (meeting) as shown in step 304, until the feedback survey is complete. A grace period may be provided during which meeting requests will be possible despite not having provided feedback.

In one aspect of the embodiment, the system provides a user meeting page at step 305a where the user can affirmatively request networking meetings using a variety of parameters including date, time, geographic preference, industry and gender. Certain users, such as for example master, advanced, or intermediate users, may have the ability to specify additional preferences as sought characteristics, for example alumni affiliation and past occupations. This affirmative request function is in addition to or an alternative to the system analyzing at step 302 user profiles 106 for matches on an on-going or regular basis and not specifically requested by a user. At step 305b, the system displays to the user the frequency at which other users have requested a specified parameter—or a sum total of those parameter requests—to assist the user in choosing parameters that increase the possibility of a match.

As an alternative to step 305a, the system will provide the user with a list of one more meeting requests from other users that are about to expire unmatched. This will be displayed on the user's personal page. These expiring unmatched meetings may be called last minute meetings. A user may choose accept a last minute meeting from the list of last minute meetings.

For all eligible users the system will attempt to match, in step 305, users for dates (meetings) and times based on criteria in the users' profiles 106 including user characteristics and sought characteristics that a user seeks in another user. The characteristics and meeting availability dates of any two or more users may be compared by the system in any order. When the system comprises a meeting request function of step 305a, the system will attempt to match, in step 305, users for dates (meetings) based on characteristics in the users' profiles and in the meeting request of step 305a. Such user profile characteristics may include purpose of the date (meeting) preference, geographic preference, prior history, ratings, a user's industry, a user's department, a user's organizational level, and a user's availability. The ratings may include a feedback rating, a follow-through rating, and a referral network strength rating.

In one embodiment, the system will exclude certain matches between certain users if for example the two users have had a prior date (meeting) or if one of the users referred the other to the service (and thus already knows him or her). Other exclusions may be possible, such as if one of the users has reached the maximum number of dates (meetings) in a given time frame. Also, in another embodiment, a particular level of user, for example a premium or master user, is able to exclude dates(meetings) with users having certain attributes, like for example, users from a particular industry, users with a certain feedback rating, users working for companies of a particular size, users managing a certain number of employees.

In one embodiment, a particular level of user will be able to customize or alter the matching algorithm to deliver results customized to that user's specific needs and desires. For example, the user may decide to weight categories like proximity or industry type, more heavily than meeting time of day, therefore yielding different matching results. Further, users may be able to specify mandatory "must have" match criteria and/or a minimum percentage match on certain criteria. In a further additional embodiment, a particular level of user may be able to modify and test the algorithm one or more times prior to making a final choice, in order to achieve a more desirable matching outcome. The data used for this test could either be current live data, historical data, or a combination of both.

In another aspect of the embodiment, the system will present the user with information regarding an aggregate sum frequency that other system users have chosen particular parameters for pending meetings, requested meetings, and for matched meetings. An active pending meeting is a meeting request that is valid and is not expired. The frequency may be displayed as a percentage of users requesting a given parameter in relation to request for all types of parameters. Alternatively, the frequency may be displayed a sum total of all users requesting a given parameter. A pending meeting is a meeting request that is not matched and includes active pending meetings and expired pending meetings. A matched meeting is a meeting where two or more users have been matched. If the system cannot make an exact match based on the user's preferences, in step 305c, the system will inform the user that an exact match was not possible. In step 305c, the system may suggest a match closest to the user's specified criteria. The system will attempt to match users each time a meeting is requested in step 305a or if meeting parameters or preferences are modified in steps 213, 214, 305a, or 305b. The system may also suggest, in step 305d that the user make certain changes to the user's preferences and criteria that are likely to increase the chances of a match. In another embodiment the system may provide a list of some near matches that might become possible matches if specific matching parameters were altered.

In another embodiment, the system may suggest other user types that may accomplish the same goal that the user is trying to accomplish based upon the types of connections the target match is closely associated with. For example, the user specifies that he wants to meet an attorney in a particular locale, but none are in the system. The system could recommend that the user try contacting a business accountant in the same locale, as an accountant may be able to provide services the user is seeking, or connect the user to an attorney who is not a member of the networking service.

For each match, the system may optionally query, in step 306, the advertiser database 107. The advertiser database is comprised of business profiles representing affiliate businesses that may host a meeting, or otherwise provide useful services to professional networking system users. Business profile contains a geographic location parameter representing one or more locations of the affiliate business corresponding to the business profile. These businesses may include, but are not limited to, restaurants, coffee shops, golf courses, country clubs, and bookstores. The advertiser profile may include a list of the business' locations, coupons or discounts available to professional networking system users. Based on the details of a particular match and proposed meeting, the system will recommend services that may be relevant and useful to meeting attendees.

The system then notifies one or more matched users of the match in step 307. In one embodiment, the system only notifies one of the matched users based on criteria from that user's profile, such as user with the longest membership, user with more prior dates, user with higher feedback rating. The system provides the user with the contact information of the other meeting attendee(s) and the meeting date and timeframe in step 308.

The system optionally provides, in step 309, the user with information from the advertiser database 107 on multiple meeting forums within the expected meeting area. In step 310, the system optionally provides the user with coupons or discount codes from the advertiser database 107 for certain products or services that may be useful to the date (meeting) attendees/matched users.

Figure 4:
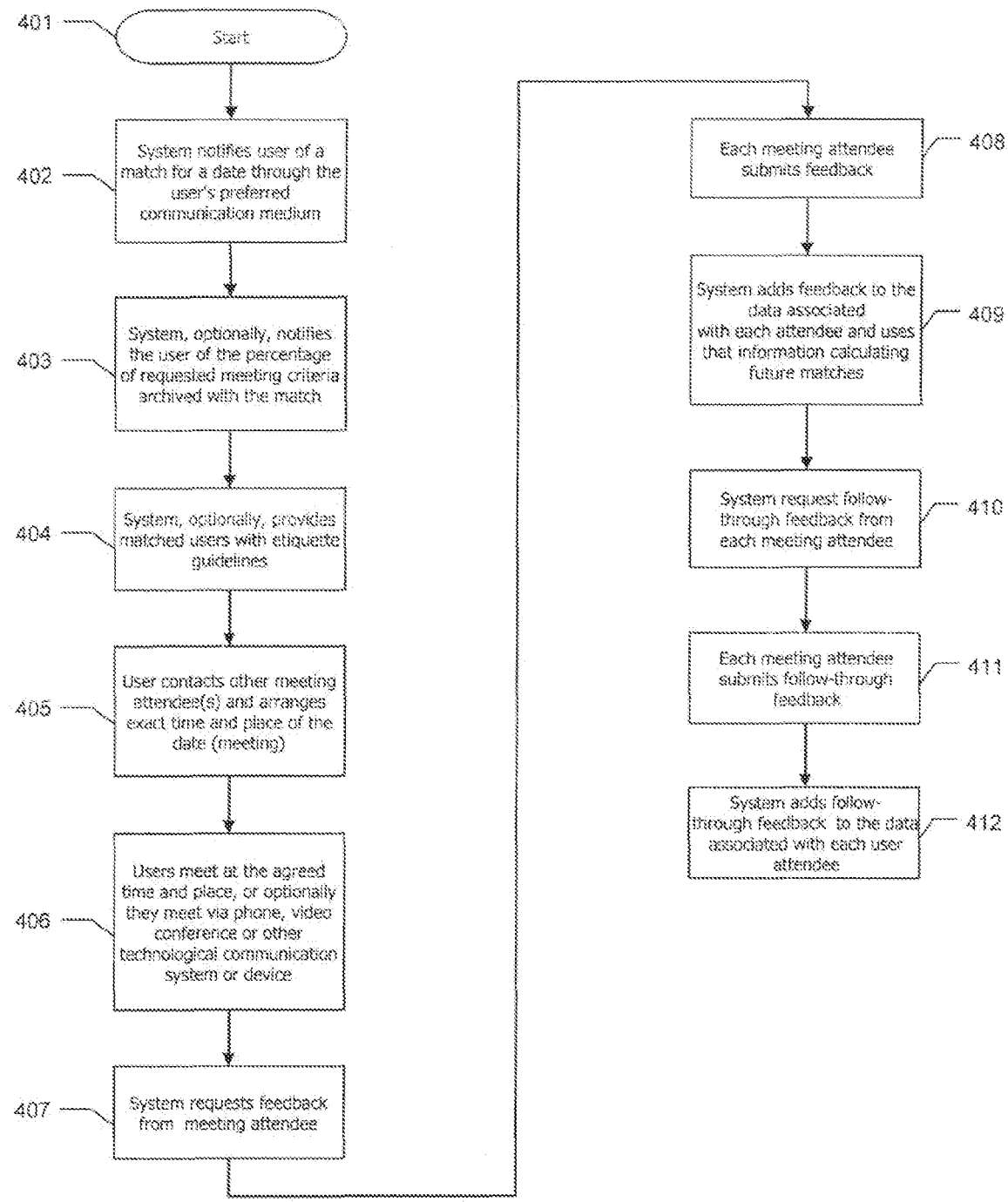
FIG. 4 is a block diagram illustrating a process in accordance with the present invention for notifying a user of a match, setting a meeting, holding a meeting, and receiving feedback on the meeting.

FIG. 4 illustrates an exemplary process, in accordance with the present invention, for notifying a user of a match, setting a meeting, holding a meeting, and receiving feedback on the meeting. In step 402, the system notifies the user of a match for a date through the user's preferred communication medium, such as email, mobile phone text-message, phone, voice-message or other communication means. In addition, the system optionally informs the user of information from the advertiser database as explained in steps 309 and 310.

Optionally in step 403, the system may inform the user of the percentage of requested meeting criteria and user characteristics that were achieved with the matched user. Optionally, in step 404, the system may provide the user with date setting and date etiquette guidelines, such as those for taking calls or returning voicemail date requests. Users who fail to follow date etiquette guidelines may be penalized or expelled from the system. In step 405, the user contacts other meeting attendee(s)/matched user(s) and arranges exact time and place of the date (meeting). In one embodiment, the system may allow, and users may choose, to meet by phone, videoconference, Internet-based conference, or other technological communication system or device. For web-conferencing, the system may provide a web-based meeting solution or may recommend third party web-conferencing providers. However, in such an embodiment the system may limit the number of times a user may engage in non-face-to-face dates within a certain timeframe.

In one aspect of the embodiment, the system will provide the meeting attendees with minimum meeting structure guidelines, such as meeting length, meeting agenda, and information on next steps and meeting wrap-up procedures. The system will provide a downloadable and printable table tent so that members will recognize the other meeting attendees.

In step 406, the users meet at the agreed place and time or meet by phone, videoconference, Internet-based conference, or other technological communication system or device. After the scheduled meeting date and time, the system sends a request for feedback to each meeting attendee in step 407. Each meeting attendee then submits feedback in step 408 on various aspects of the attendee's meeting experience. In step 409, the system then adds that feedback to the attendee's user profile and uses that information when calculating future matches.

In step 410, after a specified period of time, the system contacts each attendee and requests follow-through feedback to capture how well each attendee followed-through on any commitments that each attendee made during the meeting. In step 411, each meeting attendee submits follow-through feedback. The system, in step 412, adds follow-through feedback to the data associated with each user attendee in their respective user profiles. The system uses the follow-through feedback information as a parameter used to calculate future meeting matches. Optionally, the system may provide a webpage form, an email address, or phone number for the meeting attendee(s) to respond to the feedback provided by the other meeting attendee(s). The system may sanction users who receive negative feedback.

In one embodiment, the system may require or encourage current users to refer others to join the system as new users. The system may reward current users for referring new users. In another embodiment, ambassadors could be hired to manage local chapters within the system. The ambassadors would be paid based on a percentage of the network revenue in their geographic area. Further, the system may limit users to matches within particular geographic regions based on the user's subscription level.

In one aspect of the embodiment, each user may be assigned to one or more user groups. The system will record the user group assignment within the user group parameter of the user profile. The user group parameter comprises one or more values representing one or more groups. The user profile may also contain a permissions parameter where the permissions are for indicating whether a user may be matched with users of one or more predefined user groups. The processing unit is programmed to allow users of a first group to be matched with only users of a predefined one or more groups based on the permissions. In one aspect of the embodiment, the user's profile contains one or more referral members. The referral members are those members referred to the system by the user of the user profile. In this aspect, the system matches a first user with a second one or more users when (1) each user is available to meet, (2) at least one mutually available meeting date for each user is at a date outside of the advance notice requirement of each user, (3) the available meeting date of each user is not already matched, (4) the user is not a referred user of another matched user, (5) the user has not exceeded a predefined maximum allowed number of meetings within a present predefined time period, and (6) each user is within the geographic meeting location availability radius of the other user(s).

In one aspect of the embodiment, the system does not reveal the characteristics of one matched user to any other user including another matched user. However, the system may disclose basic contact information of one matched user to another matched user to facilitate communication about a meeting. The user's characteristics of the user profile are private and not public. The system uses private user profile characteristics of each user to generate a match, without disclosing said characteristics of one user to another user. This is in contrast to other networking systems and websites where a user's profile including user profile characteristics are made publicly available to other users or the public at large.

While the particular preferred and alternative embodiments to the present invention have been disclosed, it will be appreciated that many various modifications and extensions of the above described technology may be implemented using the teaching of this invention.

I claim:

1. A professional networking system for facilitating meetings between users, comprising:
   a computer system having
   a processor;
   a user database having a plurality of user profiles corresponding to a plurality of users;
     each user profile comprises one or more user profile characteristics, one or more meeting parameters, and one or more sought characteristics; the one or more user profile characteristics comprise characteristics of the corresponding user; the one or more meeting parameters comprise one or more available meeting dates when the corresponding user is available to meet another user; and the one or more sought characteristics correspond to one or more user profile characteristics that the user corresponding to the user profile seeks in another user;
   an advertiser database including an advertiser profile for each advertiser, each advertiser profile having at least one benefit offered by the advertiser and at least one geographic location parameter representing one or more locations where the benefit can be redeemed;
   a user matching function executable by the processor to match two or more users when the one or more available meeting dates of a first user profile of said plurality of user profiles matches the one or more available meeting dates of a second user profile of said plurality of user profiles and at least one of the one or more sought characteristic of the first user profile matches to a corresponding at least one of the one or more user profile characteristic of the second user profile by comparing the one or more available meeting dates of the first user profile with the one or more available meeting dates of the second user profile and comparing the one or more sought characteristics of the first user profile with the corresponding one or more user profile characteristics of the second user profile, where the first user profile corresponds to a first user of the two or more users and the second user profile corresponds to a second user of the two or more users;

a benefit matching function executable by the processor to generate a benefit list comprising one or more benefits by selecting one or more benefits of one or more advertiser profiles having the at least one geographic location parameter corresponding to a meeting location area of the two or more users matched by the user matching function; and, a match notification function executable by the processor to communicate over a network a match notification to notify one or more users of the two or more users matched by the user matching function, wherein the match notification includes the benefit list.

2. The system of claim 1, wherein said user matching function comprises a second step match function configured to identify a second step match where one or more sought characteristics of the second user profile corresponding to the second user of the of the two or more users matched by the matching function matches the corresponding one or more user profile characteristics of the first user profile corresponding to the first user of the two or more users matched by the matching function, and wherein said match notification function is further defined in that the match notification is communicated only when the two or more users matched by the matching function are also are identified as the second step match by the second step match function.

3. The system of claim 1, wherein at least one meeting parameter comprises one or more available meeting times when the user is available to meet another user;

and wherein the user matching function is further configured to match two or more users when at least one available meeting date of the one or more available meeting dates and at least one of the one or more available meeting time of the first user profile matches at least one available meeting date of the one or more available meeting dates and at least one of the one or more available meeting time of the second user profile after comparing the one or more available meeting times of the first user profile with the one or more available meeting times of the second user profile.

4. The system of claim 1, wherein at least one user profile characteristic of the one or more user profile characteristics is of a type chosen from the group consisting of:
(a) a geographic meeting area in which the user of the user profile prefers a meeting to be located;
(b) a business type corresponding to a type of business the user operates;
(c) a gender of the user;
(d) an advance notice requirement representing a time frame between notice of the meeting and an actual meeting date;
(e) a time of day in which the user prefers to meet;
(f) feedback rating calculated based on feedback ratings provided by one or more other users that had prior meetings with the user;
(g) a following-through rating calculated based on responses by one or more other users that had a prior meeting with the user of the user profile, wherein the response indicated whether the user followed through with plans made during a prior meeting;
(h) a referral network strength rating calculated based on a number of other users referred to the system by the user;
(i) a meeting count representing a number of meetings the user had during a predefined time period; and,
(j) one or more referred users IDs representing users referred to the system by the user of the user profile.

5. The system of claim 1 wherein at least a portion of the network comprises the Internet.

6. The system of claim 1, wherein two or more profiles of the plurality of user profiles comprise a user type parameter; and the system comprising
a user type characteristic selection function executable by the processor to allow users corresponding to user profiles having the user type parameter being a second value to specify a greater number of sought characteristics than users corresponding to user profiles having the user type parameter being a first value.

7. The system of claim 1, wherein two or more user profiles of the plurality of user profiles comprise a user type parameter;
and wherein the one or more sought characteristics comprise a number of different characteristics; and wherein the one or more sought characteristics comprise at least a first group of sought characteristics and a second group of sought characteristics; and
the system comprising a user type characteristic group selection function executable by the processor to allow users corresponding to user profiles having the user type parameter being a second value to specify, in that user's profile, sought characteristics from more than one group of sought characteristics, and to allow users corresponding to user profiles having the user type parameter being a first value to specify, in that user's profile, sought characteristics from only the first group of sought characteristics.

8. The system of claim 1, wherein two or more user profiles of the plurality of user profiles comprise a user group parameter, and wherein the user group parameter comprises one or more values representing one or more groups;
and the system comprising a group limiting function executable by the processor to allow users of a first group to be matched with only users of a predefined one or more groups.

9. The system of claim 1, wherein one or more user profile characteristics of each the plurality of user profiles are private and wherein one or more private profile characteristics of a user profile are used by the user matching function to match users without directly communicating the private user profile characteristics to another user.

10. The system of claim 1, wherein two or more user profiles of the plurality of user profiles comprise a user type parameter;
and the system comprising a geographic scope function executable by the processor to allow users corresponding to user profiles having the user type parameter being a second value to seek snatches in a broader geographic region than users corresponding to user profiles having the user type parameter being a first value.

11. The system of claim 1, wherein
the at least one sought characteristic and the at least one user profile characteristic of each user profile each comprise a user preferred geographic meeting location area; and
the system comprising a geographic match function executable by the processor to generate a geographically matched advertiser list of geographically matched advertisers comprising one or more advertisers from the advertiser database by comparing the at least one geographic location parameter of the advertiser profile with the user preferred geographic meeting location area of each user of two or more users matched by the user matching function; and wherein the match notification includes in the benefit list only benefits offered by advertisers that are found on the geographically matched advertiser list and wherein the benefit list includes the advertisers corresponding to the benefits listed.

12. The system of claim 1, comprising a feedback function executable by the processor to communicate a request to at least one user of the two or more users matched by the user matching function to input one or more feedback parameters for at least one other user of the two or more users matched by the user matching function, and to request the input a predetermined time after the two or more users matched by the user matching function are scheduled to meet, and to store the input in the user profile of the user receiving feedback.

13. The system of claim 1, wherein at least one user profile of the plurality of user profiles comprise one or more undesirable characteristics; and wherein the user matching function has an exclusion function executable by the processor to exclude a given user of the plurality of users from matching with an another user if the another user profile has a user profile characteristic matching an undesirable characteristic specified in the user profile of the given user.

14. The system of claim 1, wherein the at least one sought characteristic comprises a geographic meeting location area; and the system comprising a last minute meeting display function executable by the processor to display on a user personal page a list of one or more last minute meetings with one or more users of the plurality of users which occur within a predefined time of a present time and within the geographic meeting location area of the user profile corresponding to the user personal page; and wherein the user matching function comprising a last minute meeting scheduling function executable by the processor to last minute match the user who selects a last minute meeting with another user who requested the last minute meeting; and wherein the match notification function is further configured to notify users last minute matched of the last minute match.

15. The system of claim 1, comprising a parameter frequency calculating function executable by the processor to calculate a parameter frequency value for the one or more sought characteristics corresponding to a frequency that users within the system have chosen the a given user parameter as a sought characteristic.

16. The system of claim 15, comprising a parameter frequency display function executable by the processor to display a meeting parameter input interface, and to display in the interface one or more parameter frequency values corresponding to the one or more sought characteristics to enable the user to specify the one or more sought characteristics that enable an increased likelihood of a user match.

17. The system of claim 1, further comprising a near match function to nearest match a third user of the plurality of users with a fourth user of the plurality of users when a match is not made between the third user and the fourth user and a user profile characteristic of a fourth user profile corresponding to the fourth user is within a predefined deviation range from a value of the corresponding sought characteristic of a third user profile corresponding to the third first user; and wherein the match notification function is further configured to communicate to the third user the nearest match and to inform the third user that the match is the nearest match.

18. The system of claim 1, comprising a characteristic suggestion function executable by the processor to communicate to at least one user of the plurality of users one or more alternative sought characteristics or alternative values for sought characteristics to increase a likelihood of a match.

19. A computer implemented professional networking system for facilitating meetings between users, comprising:
a processor;
a memory comprising at least a user database and an advertiser database;
the user database having a user profile corresponding to each user;
each user profile comprises one or more user profile characteristics, one or more meeting parameters, and one or more sought characteristics; the one or more user profile characteristics comprise characteristics of the corresponding user; the one or more meeting parameters comprise one or more available meeting dates when the corresponding user is available to meet another user; and the one or more sought characteristics correspond to one or more user profile characteristics that the user corresponding to the user profile seeks in another user;
the advertiser database including an advertiser profile for each advertiser, each advertiser profile having at least one benefit offered by the advertiser and at least one geographic location parameter representing one or more locations where the benefit can be redeemed;
a user matching function stored on the memory and executable by the processor to match two or more users based on one or more meeting dates and at least one sought characteristic by comparing the available meeting dates of one user profile with the available meeting dates of another user profile, and comparing the one or more sought characteristics of the one user profile with the corresponding one or more user profile characteristics of the another user profile;
a benefit matching function stored on the memory and executable by the processor to generate a benefit list comprising one or more benefits by selecting one or more benefits of one or more advertiser profiles having the at least one geographic location parameter corresponding to a meeting location area of the two or more users matched by the user matching function; and,
a match notification function stored on the memory and executable by the processor to communicate over a network a match notification to notify one or more users of the two or more matched by the user matching function, wherein the match notification includes the benefit list.

20. The system of claim 19, wherein the at least one benefit offered by the advertiser is a coupon.

21. The system of claim 19, wherein each advertiser profile comprises at least one value added parameter; and wherein the benefit matching function is further configured to generate the benefit list comprising one or more benefits be selecting benefits corresponding to the one or more advertiser profiles having a value added parameter corresponding to at least a predefined one of the user profile characteristics of at least one of the two or more matched by the user matching function.

22. A professional networking system for facilitating meetings between users, comprising:
a computer system having
a processor;
a datastore including a user database and an advertiser database;

the user database having a plurality of user profiles, each user profile comprises one or more user profile characteristics, one or more meeting parameters, and one or more sought characteristics; the one or more user profile characteristics comprise characteristics of the user; the one or more meeting parameters comprise one or more available meeting dates when the user is available to meet another user; and the one or more sought characteristics correspond to one or more user profile characteristics that the user corresponding to the user profile seeks in another user;

the advertiser database having one or more advertiser profiles, each advertiser profile having at least one benefit offered by the advertiser and at least one geographic location parameter representing one or more locations where the benefit can be redeemed;

programming code on the computer system for creating a match between two or more users based on one or more meeting dates and at least one sought characteristic by comparing the available meeting dates of one user profile of the plurality of user profiles with the available meeting dates of another user profile of the plurality of user profiles, and comparing the one or more sought characteristics of the one user profile with the corresponding one or more user profile characteristics of the another user profile;

programming code on the computer system for generating a benefit list comprising one or more benefits by selecting the benefits of one or more advertiser profiles having the at least one geographic location parameter corresponding to a meeting location area of the two or more users of the match; and, programming code on the computer system for communicating over a network a match notification to notify one or more of the two or more users of the match, wherein the match notification includes the benefit list.

* * * * *